Dec. 13, 1960   J. S. ZINK, JR., ET AL   2,964,121
MUFFLER FOR GASEOUS FUEL ASPIRATOR
Filed Nov. 18, 1958

INVENTORS
JOHN S. ZINK, JR.
ORVILLE P. EDWARDS
ROBERT P. DUNCAN
ROBERT D. REED
BY
ATTORNEY

United States Patent Office 2,964,121
Patented Dec. 13, 1960

2,964,121

MUFFLER FOR GASEOUS FUEL ASPIRATOR

John S. Zink, Jr., Orville P. Edwards, Robert P. Duncan, and Robert D. Reed, all of Tulsa, Okla., assignors to John Zink Company, Tulsa, Okla., a corporation of Delaware Filed Nov. 18, 1958, Ser. No. 774,746

2 Claims. (Cl. 181—50)

The present invention relates to means for suppressing noise developed by the operation of a device for mixing air and gas to provide a gaseous fuel mixture for fuel burners and the invention more particularly pertains to baffle means or absorbing means mounted in association with such a fuel mixing device to muffle the noise created by the air moving rapidly into the presence of the gas discharged through a limiting orifice into the mixing throat of an aspirator.

A highly useful arrangement for supplying gaseous fuel to a burner includes apparatus providing for the escape of the gas through a limiting orifice at significant pressures into the upstream end of conduit means. The gas as it escapes from the limiting orifice sets up a low pressure condition in the mouth of the conduit means whereby primary air is induced to move into the upstream end of the conduit means for mixture with the gas. Audible sound is created by the inrushing air and by the gas escaping through the limiting orifice and when the volume of these gases is large such as required for industrial burners the noise is objectionable. Accordingly it is an object of the present invention to provide means for suppressing the noise created by the air moving rapidly into the presence of the gas and to provide means to muffle or absorb the noise created by the gas escaping through the limiting orifice into the mixing throat of an inspirating device forming a part of the fuel supply equipment for a burner.

A more detailed object of the invention is to provide baffle means which may be readily mounted on various types of fuel mixing devices of an inspirating type for absorbing the noise created by the inrushing air and absorbing the noise developed by the escaping gas jet and to provide such baffle means with such a structure as to avoid any substantial interference with the movement of primary air into the inspirating device.

Another object of the invention is to provide a muffler for a gaseous fuel mixing device which may readily be mounted on the upstream end of conventional types of aspirating equipment.

Other objects and features of the invention will be appreciated and become apparent particularly to those skilled in the gaseous fuel burner art as the present disclosure proceeds and upon consideration of the accompanying drawing and the following detailed description wherein several embodiments of the invention are disclosed.

Figure 1:
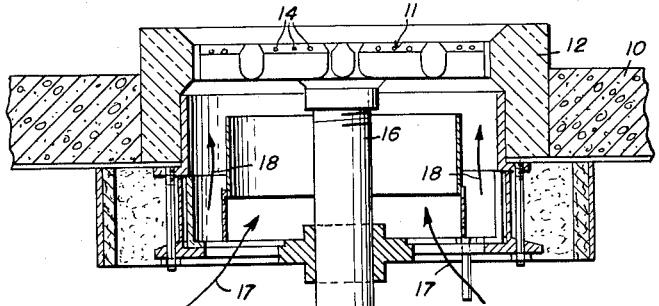
Fig. 1 is a view partly in section showing a conventional fuel mixing device of the aspirator type for supplying a gaseous fuel mixture to a burner with the sound absorbing means indicated by phantom lines.

The invention is directed to means for absorbing the noise developed by the movement of air and gas into the upstream end of a mixing device for supplying fuel to a gas burner and the invention has particular utility in connection with burners of large capacity for industrial purposes. There is shown at 10 the wall or floor of a chamber to be fired by a burner 11 which may be of the spider type. A ceramic member or tile 12 is mounted in the opening of the wall or floor 10 and surrounds the burner 11. The burner is provided with discharge ports 14 for the escape of the gaseous fuel mixture which is supplied to the burner head 11 through a conduit 16. The burner assembly may be provided with any suitable means to control the volume of secondary air admitted to the presence of the burner head. In the embodiment shown the secondary air moves in the direction of the arrows 17 and 18 and the volume of secondary air may be controlled by suitable shutter means of a known type.

A conventional arrangement for supplying gaseous fuel mixture into the conduit 16 includes a gas supply pipe 21 which is provided with a limiting orifice 22 arranged to discharge gas into an aspirator type of mixing device. The aspirator includes a conduit member 23 having an enlarged upstream end 24 into which the gas escaping from the limiting orifice 22 is discharged. The gas escaping at relatively high velocity through the orifice 22 sets up audible noise and creates a low pressure condition within the inspirating device. Air in induced to move into the low pressure zone set up within the upstream end of the conduit means 23 and the air moves into the aspirator generally in the direction of the arrows 26. The conduit means thus provides an inspirating device which mixes primary air with the gaseous fuel for delivery into the pipe 16. The volume of primary air is controlled by means of a disc or door 27 movable towards or away from the free end of the inspirating device to thereby control the volume of the air inspirated into the mixing device.

Figure 2:
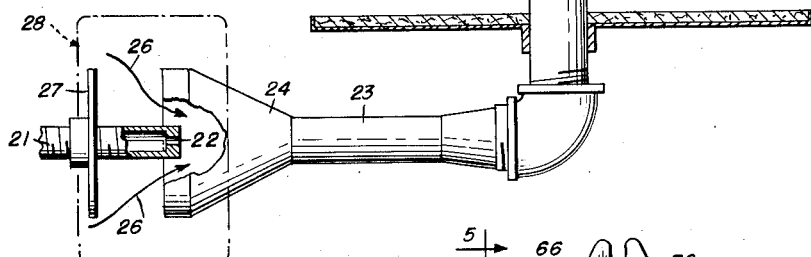
Fig. 2 is a side elevational view on a larger scale showing one part of the sound absorber in association with the upstream end of the aspirator.
Figure 3:
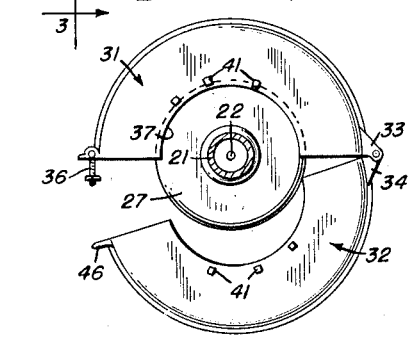
Fig. 3 is en end view partly in section taken on the line 3—3 of Fig. 2.

The escape of the gaseous fuel through the orifice 22 and the air rushing into the upstream end of the mixing device sets up objectionable noise particularly when the burner requires a large volume of fuel. The invention is directed to absorbing means mounted adjacent the upstream end of the conduit means 23 and in the area 28 indicated by phantom lines in Fig. 1. The structural characteristics of the sound absorbing means is best shown in Figs. 2 and 3 and this assembly is adapted to be mounted on the air control door or disc 27 which is movable axially along the supply pipe 21. The sound muffling means includes two generally hemi-cylindrical sections 31 and 32 which are pivotally connected to each other by suitable lugs 33 and 34. The sections 31 and 32 may be hinged towards each other about the air control disc 27 and held in a closed position by means of a bolt and nut assembly 36 so as to provide a cylindrical shaped assembly.

The upstream end of the muffler assembly is provided with a relatively large central opening 37. Each section 31 and 32 is provided with axially spaced circumferentially extending flanges 38 and 39 which provide an annular space therebetween for accommodating the peripheral portion of the air shutter or disc 27. Set screws 41 are provided for engaging the peripheral portion of the air shutter so as to hold the muffle means in association therewith. Each section 31 and 32 of the sound absorbing means includes a skirt portion 43 each of which is of hemi-cylindrical formation and forms a complete cylinder when the two sections are secured to each other by the bolt and nut assembly 36 cooperating with the apertured lug 46 carried by the section 32. The hemi-cylindrical portions 43 are of larger diameter than the flared end portion 24 of the inspirating device. Each hemi-cylindrical section 31 and 32 carries a layer of loosely felted wool of a mineral or other suitable type to provide a relatively thick layer of sound absorbing material 48. An inturned flange 49 is provided at the end of each hemi-cylindrical skirt 43 and a flange 51 is provided at the free end of the flange 49 for holding the sound absorbing layer 48 in position. A perforated metal liner 52 may be provided covering the inner face of the sound absorbing layer 48. An annular ring 53 of sound absorbing material may be provided between the inner face of the sound absorbing layer 48 and the exterior face 54 of the flange structure 39.

In operation when the sections 31 and 32 are hinged to a closed position about the air shutter 27 and secured to each other by the bolt and nut assembly 36 and when the set screws 41 are tightened against the perimeter of the air shutter 27 the sound absorbing device is supported about the upstream end of the mixing device and the muffler assembly is moved with any adjustment of the air shutter 27 axially along the gas supply pipe 21. The sound absorbing assembly does not alter the volume of primary air which then moves in the direction of the arrows 56. The sound absorbing material effectively dampens the noise of the gas escaping through the discharge orifice 22 and the noise developed by the inrushing air is also suppressed by the sound absorbing layers 48 and 53.

Figure 4:
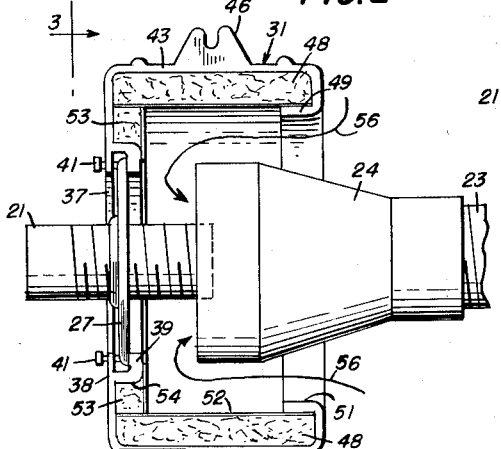
Fig. 4 is a side elevational view of one part of a modified sound absorber in association with a different type of aspirator.
Figure 4:
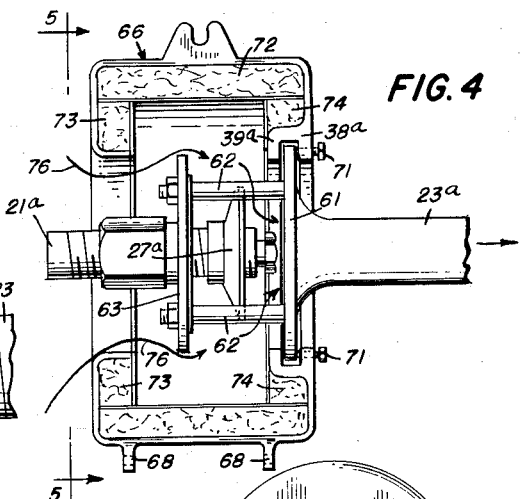

Another known type of inspirating device 23a is shown in Fig. 4 which carries an annular flange 61 at right angles to the axis of the gas supply pipe 21a. A plurality of circumferentially spaced studs 62 carried by the flange 61 support a disc 63 in a position spaced upstream of the entrance end of the mixing throat of the inspirator 23a. The disc 63 provides support for the gas supply pipe 21a so as to align the discharge orifice with the axis of the inspirator. A disc or door 27a for controlling the volume of primary air is mounted on the gas supply pipe 21a so as to be movable axially thereof.

Figure 5:
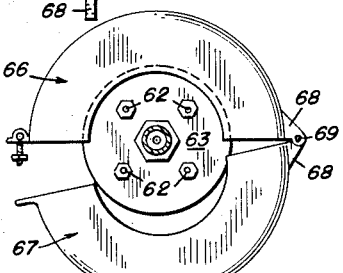
Fig. 5 is an end view of the absorber shown in part in Fig. 4 and taken on the line 5—5 of Fig. 4.

In the embodiment shown in Figs. 4 and 5 the sound absorbing means includes two hemi-cylindrical sections 66 and 67 which are connected to each other by a hinge structure which includes lugs 68 and a pin 69. These sections may be hinged to a closed position about the perimeter of the flange 61 so that the spaced flanges 38a and 39a embrace a peripheral portion of the annular flange 61. Set screws 71 are provided for maintaining the sound absorber means in association with the inspirating device. Each hemi-cylindrical section 66 and 67 carries a layer 72 of loosely felted wool of any suitable type. An annular layer 73 is carried by the upstream end of each hemi-cylindrical section as shown in Fig. 4. An additional annular layer of sound absorbing material 74 is carried by each section between the inner face of the layer 72 and the periphery of the flanges structure 39a.

In operation and when the two hemi-cylindrical sections 66 and 67 are clamped to each other with the flanges 38a and 39a embracing a peripheral portion of the flange 61 and with the set screws 71 threaded home the sound absorbing assembly is supported in a manner as shown in Fig. 4 adjacent the upstream end of the inspirating device. The inrushing air then moves in paths generally as indicated by the arrows 76 so that the noise developed by the inrushing air and the gaseous fuel escaping through the limiting orifice into the aspirator are both absorbed by the loosely felted wool layers carried by the muffling device. Each embodiment of the sound absorbing means may be readily mounted on the fuel mixing device and the embodiment shown in Figs. 2 and 3 does not require detachment in order to provide for adjustment of the air shutter 27 which controls the volume of primary air. In the embodiment shown in Figs. 4 and 5 adjustment of the air shutter 27a may be made by hinging one of the sections 66 or 67 to an open position whereby the position of the air shutter 27a may be readily adjusted.

While the invention has been shown and described with reference to particular structural features and with regard to two conventional types of fuel mixing devices of the inspirating type it will be appreciated that changes may be made in the various elements as well as the general organization. Such changes and others may be made without departing from the spirit and scope of the invention as set forth in the appended claims.

What we claim and desire to secure by Letters Patent is:

1. A sound absorbing muffler for a gaseous fuel mixing device of the aspirator type comprising, a hemi-cylindrical shaped section, a pair of radially disposed axially spaced circumferentially extending flanges carried by said section providing a circumferentially extending groove therebetween, circumferentially spaced set screws threaded through one of said flanges and extending into said groove, sound absorbing material overlying the interior of said section substantially flush with the circumferential ends thereof, a second hemi-cylindrical shaped section, a pair of radially disposed axially spaced circumferentially extending flanges carried by the second section providing a circumferentially extending groove therebetween, circumferentially spaced set screws threaded through one of the flanges of said second section and extending into the groove thereof, sound absorbing material overlying the interior of said second section substantially flush with the circumferential ends thereof, means pivotally connecting circumferential ends of said sections to each other for hinged movements into complementary relationship, detachable means connecting the other circumferential ends of said sections, and said complementary sections having a substantially circular opening in the end opposite said flanges.

2. A sound absorbing muffler for a gaseous fuel mixing device of the aspirator type comprising, a hemi-cylindrical shaped section, a pair of radially disposed axially spaced circumferentially extending flanges carried by said section providing a circumferentially extending groove therebetween, one of said flanges being flush with an end of said section, circumferentially spaced set screws threaded through the outer flange and extending into said groove, a sound absorbing layer along the inner circumference of said section substantially flush with the circumferential ends thereof, a second hemi-cylindrical shaped section, a pair of radially disposed axially spaced circumferentially extending flanges carried by the second section providing a circumferentially extending groove therebetween, one of the flanges on the second section being flush with an end thereof, circumferentially spaced set screws threaded through the outer flange of said second section and extending into the groove thereof, a sound absorbing layer along the inner circumference of said second section substantially flush with the circumferential ends thereof, means pivotally connecting circumferential ends of said sections to each other for hinged movements into complementary relationship, detachable means connecting the other circumferential ends of said sections, and a hemicircular inturned flange carried by the other end of each section covering adjacent portions of the associated sound absorbing layer and defining the perimeter of an opening in the end of the complementary sections.

References Cited in the file of this patent

UNITED STATES PATENTS

| | | |
|---|---|---|
| 381,632 | Miller | Apr. 24, 1888 |
| 2,412,394 | Giles | Dec. 10, 1946 |
| 2,505,854 | Curzon | May 2, 1950 |
| 2,670,034 | Thompson | Feb. 23, 1954 |

FOREIGN PATENTS

| | | |
|---|---|---|
| 409,404 | Great Britain | May 3, 1934 |
| 410,721 | Great Britain | May 24, 1934 |
| 260,802 | Switzerland | Aug. 1, 1949 |